United States Patent [19]
Nishio et al.

[11] Patent Number: 5,467,438

[45] Date of Patent: Nov. 14, 1995

[54] METHOD AND APPARATUS FOR COMPENSATING FOR COLOR IN COLOR IMAGES

[75] Inventors: Kazutaka Nishio, Moriguchi; Kenji Nishimura, Sakai; Toshiya Naka, Osaka; Yoshimori Nakase, Kawachinagano, all of Japan

[73] Assignee: Matsushita Electric Industrial Co., Ltd., Osaka, Japan

[21] Appl. No.: 65,427

[22] Filed: May 24, 1993

Related U.S. Application Data

[63] Continuation of Ser. No. 597,360, Oct. 10, 1990, abandoned.

[30] Foreign Application Priority Data

Oct. 13, 1989 [JP] Japan .................................. 1-266489
Jan. 30, 1990 [JP] Japan .................................. 2-19503

[51] Int. Cl.$^6$ .................................................. G06T 15/50
[52] U.S. Cl. .................................................. 395/131
[58] Field of Search .................................. 395/131, 132, 395/126; 358/75, 80, 703; 364/525

[56] References Cited

U.S. PATENT DOCUMENTS

| | | | |
|---|---|---|---|
| 4,096,523 | 6/1978 | Belmares-Sarabia et al. | 358/80 |
| 4,384,336 | 5/1983 | Frankle et al. | 382/49 |
| 4,649,423 | 3/1987 | Hoffrichter et al. | 358/80 |
| 4,816,900 | 3/1989 | Tokunaga et al. | 358/75 |
| 4,975,861 | 12/1990 | Fujimoto | 364/521 |
| 5,317,678 | 5/1994 | Okawara et al. | 395/126 |

FOREIGN PATENT DOCUMENTS

8500913  2/1985  WIPO.

OTHER PUBLICATIONS

Cohen et al, "A Progressive Refinement Approach to Fast Radiosity Image Generation", Computer Graphics, vol. 22, No. 4, Aug. 1988, pp. 75–84.

Michael F. Cohen, "An Efficient Radiosity Appraoch for Realistic Image Synthesis", IEEE Computer Graphics and Applications, vol. 6, No. 3, pp. 26–35, Mar. 1986.

*Primary Examiner*—Heather R. Herndon
*Assistant Examiner*—Michael S. Smith
*Attorney, Agent, or Firm*—Stevens, Davis, Miller & Mosher

[57] ABSTRACT

Color compensation is performed in color images for use in an image processing field which is employed for three-dimensional computer graphics and the like by making a luminance value of texture data coincide with an intensity derived by an intensity calculation. Also, lightness compensation is performed for a color image according to a display scene. From measurements of color changes of plural colors in a uniform color space, a color change of arbitrary texture data under a chromatic color light source is represented and compensated. The generated image is very natural because compensation is achieved between a lightness of a texture itself representing a pattern on the surface of an object and an intensity of the surface of the object derived by an intensity calculation when an image is generated.

6 Claims, 4 Drawing Sheets

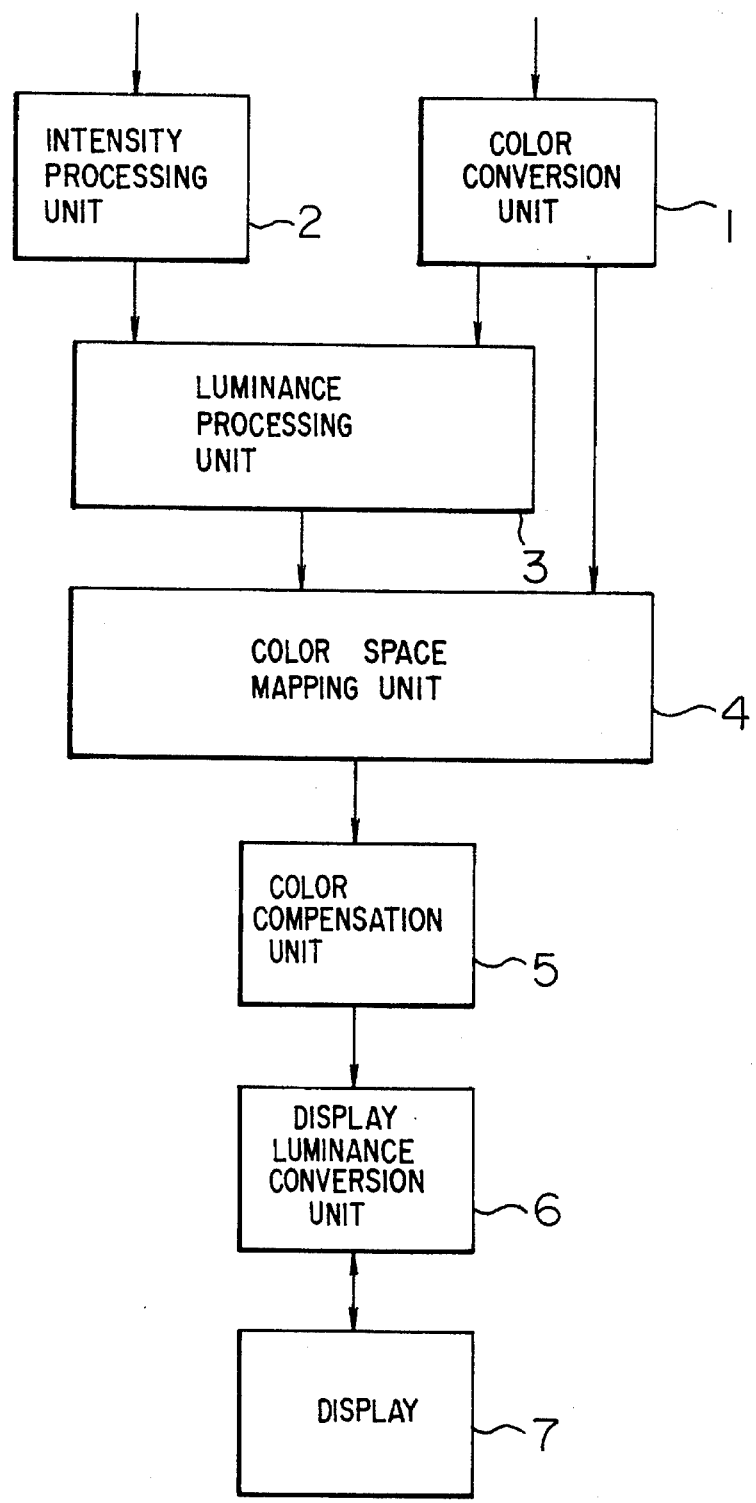
F I G. 1

METHOD AND APPARATUS FOR COMPENSATING FOR COLOR IN COLOR IMAGES

This application is a continuation of application Ser. No 07/597,360, filed Oct. 10, 1990 (abandoned).

BACKGROUND OF THE INVENTION

This invention relates to a method and an apparatus for compensating for color in color images in the image processing field. Conventionally, in the three-dimension computer graphics field, no compensation has heretofore been made between a luminance of a texture itself representing a pattern on the surface of an object and an intensity of the surface of the object derived by an intensity calculation when an image is generated. For this reason, a generated image has a lightness different from that of the original object and therefore appears awkward or unnatural. Also, the display characteristics of a display apparatus have not been considered with respect to generation of images, which results in displaying unnatural images having a changed hue. Further, when a colored light source is used, there has not been heretofore provided a method for representing a change in color of a texture, so that natural images have not been generated under such colored light source.

SUMMARY OF THE INVENTION

It is an object of the present invention to provide a definite formula representing a relationship between an intensity of an object derived by an intensity calculation and a lightness or a luminance of a texture by the use of a uniform color space, to thereby generate an image quality close to that of a photograph.

To achieve the above object, the present invention employs the following methods. In the discussion below, the luminance and lightness are assumed to be interchangeable with each other by a color-space conversion.

Color image data is converted to a uniform color space, and a luminance of an object is calculated from a ratio of an intensity on the surface of the object derived by an intensity calculation to a maximal intensity, the reflectance of the object and the luminance of a standard white.

When a lightness of a surface irradiated with a chromatic color reference light is calculated from a lightness of the surface irradiated with an achromatic color reference light, such lightness is calculated by a standard white irradiated with the achromatic and chromatic color reference lights and a mapping representing a displacement amount of an arbitrary color in a color space which is calculated based on chromaticity coordinates of a standard color patch.

When the lightness of color image data is to be changed, a saturation is changed in proportion to a changing rate of the lightness within a range which does not exceed the lightness of the standard white irradiated with the chromatic color reference light, or the saturation is decreased in proportion to the changing rate of the lightness.

When a range of a display luminance of output images to be displayed is to be compensated for, the display luminance of an image output apparatus is calculated from a median display luminance and a maximal display luminance and a minimal display luminance and a luminance of color image data.

BRIEF DESCRIPTION OF THE DRAWINGS

FIG. 1 is a block diagram schematically showing an embodiment of a method and an apparatus for compensating for color in color image according to the present invention;

DESCRIPTION OF THE PREFERRED EMBODIMENTS

Figure 2:
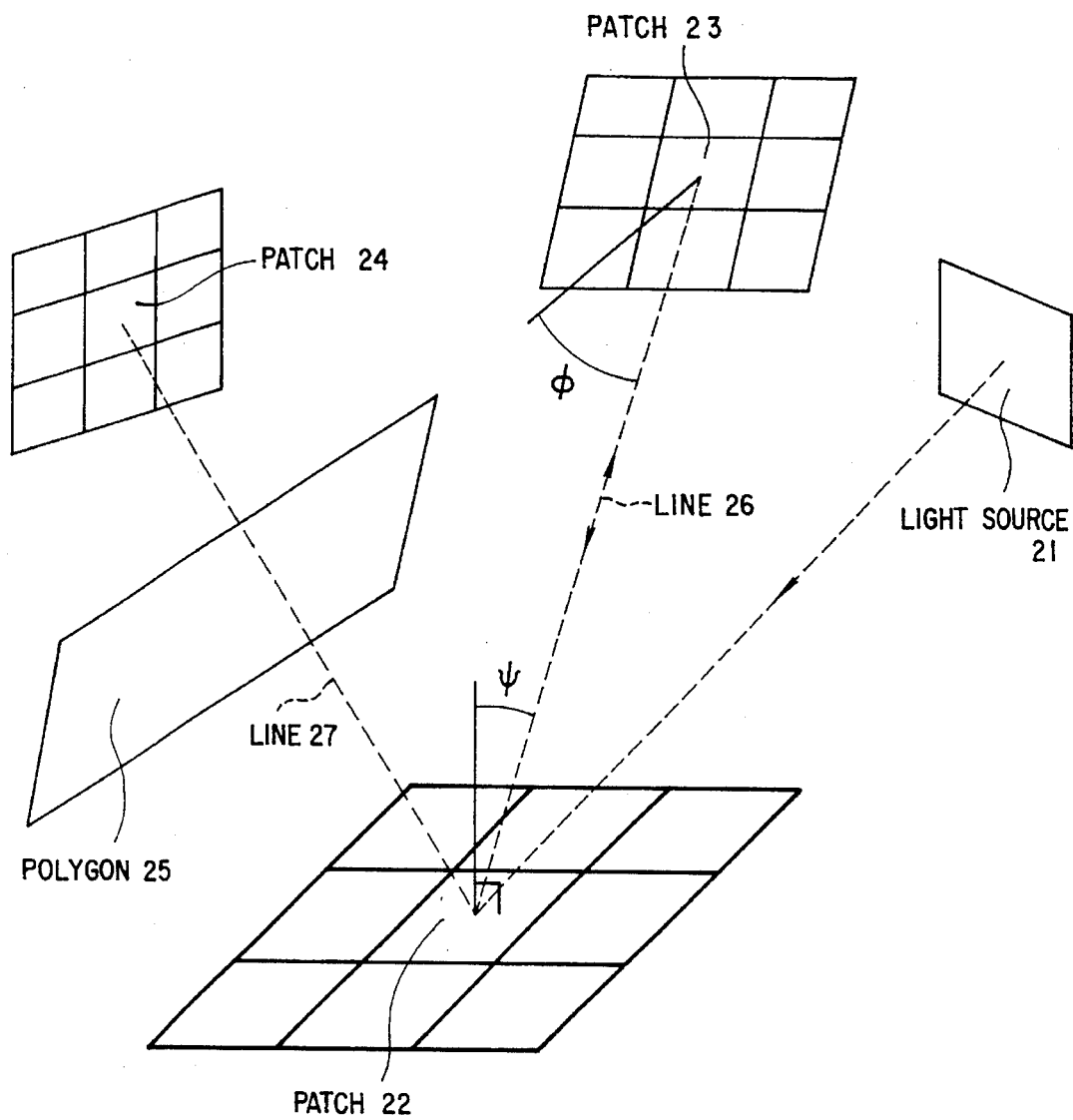
FIG. 2 is a diagram showing how an intensity is calculated by a mutual reflection.
Figure 3A:
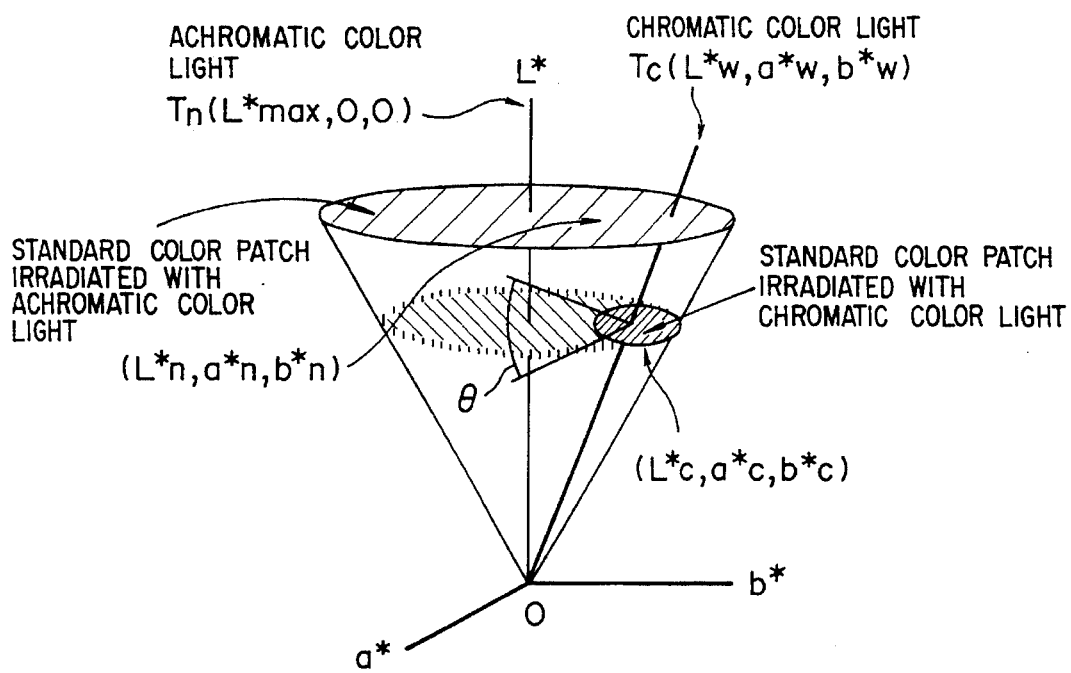
FIGS. 3A and 3B are diagrams showing the coordinates of a standard color patch in a color space irradiated with an achromatic color reference light and a chromatic color reference light.
Figure 3B:
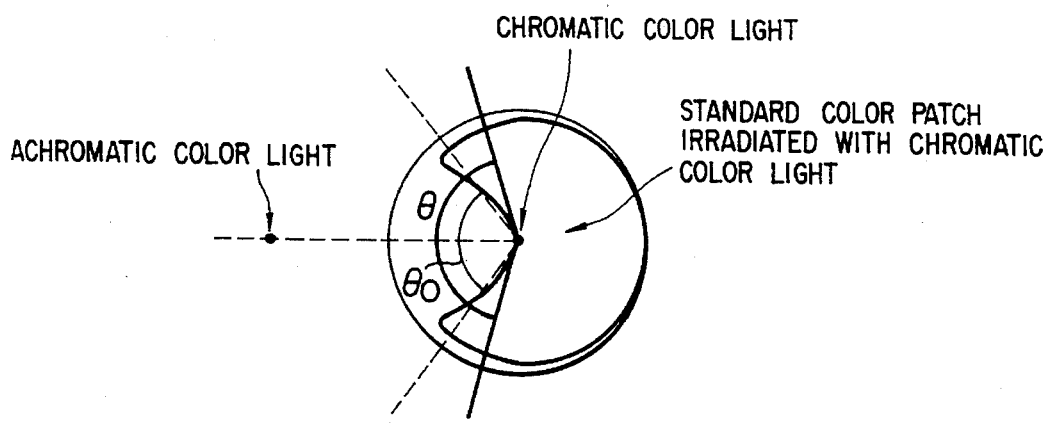
Figure 4:
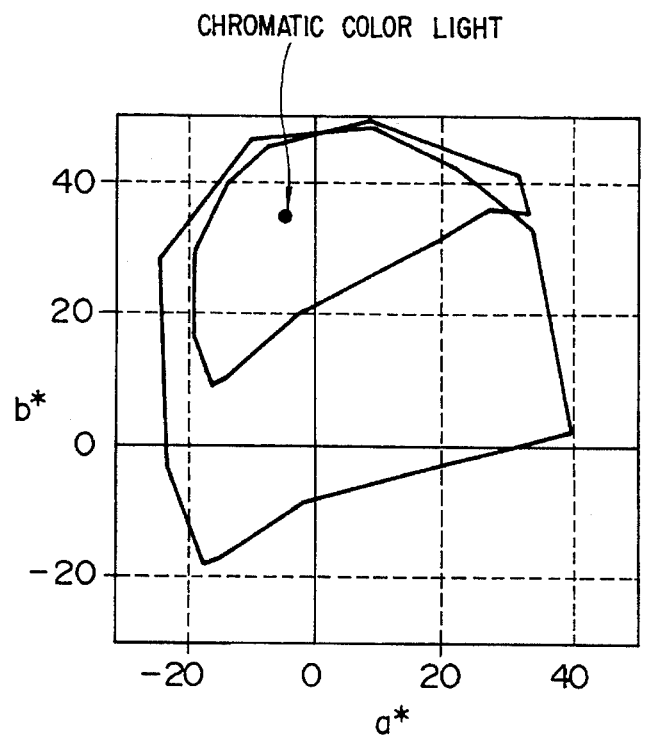
FIG. 4 is a diagram showing an example of measuring a lightness, a saturation and a hue of a standard color patch having a lightness of 70 when irradiated with a chromatic color reference light Tc.
Figure 5:
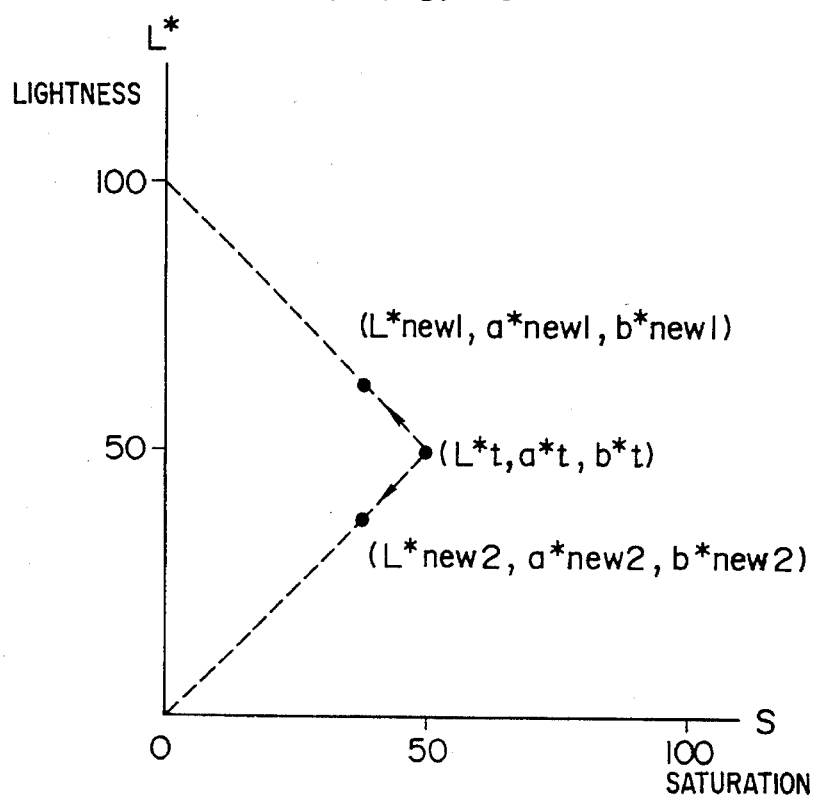
FIG. 5 is a diagram representing an example of handling a saturation which may be needed by a change in lightness.

An embodiment of a method and an apparatus for compensating for color in color images according to the present invention will hereinafter be explained with reference to the accompanying drawings. FIG. 1 shows an embodiment of a method and an apparatus for compensating color in color images according to the present invention. FIG. 2 shows how an intensity is calculated by a mutual reflection. FIGS. 3A and 3B are diagrams showing the coordinates of a standard color patch in a color space irradiated with an achromatic color reference light and a chromatic color reference light. FIG. 4 is a diagram showing an example of measuring a lightness, a saturation and a hue of a standard color patch having a lightness of 70 when irradiated with a chromatic color reference light Tc. FIG. 5 is a diagram representing an example of handling a saturation which may be needed by a change in lightness.

A color conversion unit 1 converts the coordinates of each pixel of texture data previously inputted by an image inputting apparatus such as a scanner to a uniform color space. The uniform color space is defined as a space in which a difference between every two chromaticity points is all equivalent. In this embodiment, a CIELAB uniform color space is given as an example of the uniform color space and the texture data is assumed to be represented by an RGB color system, wherein R, G and B designate coordinates respectively representing red, green and blue components of respective pixels of an image.

The color conversion unit 1 converts data in the RGB color system through an XYZ color system to L* a* and b* which is one of the uniform color spaces. A series of these conversions are given by the following formulae (1) and (2), wherein L* represents a lightness, and a* and b* together represent a hue and a saturation. The hue is given by $\tan^{-1}(b*/a*)$, and the saturation by $(a* \cdot a* + b* \cdot b*)^{1/2}$. Further, X, Y and Z represent tristimulus values represented by the XYZ color system, wherein Y corresponds to the luminance.

$$\begin{bmatrix} X \\ Y \\ Z \end{bmatrix} = \begin{bmatrix} 0.6067 & 0.1736 & 0.2001 \\ 0.2988 & 0.5868 & 0.1144 \\ 0 & 0.0661 & 1.1150 \end{bmatrix} \begin{bmatrix} R \\ G \\ B \end{bmatrix} \quad (1)$$

$$L* = 116(Y/Y_0)^{1/3} - 16$$

$$a* = 500[(X/X_0)^{1/3} - (Y/Y_0)^{1/3}]$$

$$b* = 200[(Y/Y_0)^{1/3} - (Z/Z_0)^{1/3}] \quad (2)$$

where $X_0$, $Y_0$ and $Z_0$ represents values X, Y and Z for the standard white.

Next, an intensity processing unit 2 calculates an intensity by the use of data indicative of the shape of an object, the reflectance of the surface of the object, which is one of attribute data representing optical characteristics, and light source data. One of the methods for calculating the intensity may be effected by mutual reflection.

The intensity calculation by mutual reflection calculates an intensity of the surface of an object from the position, shape and light emitting characteristics of light sources, the position and area of the object which are included in shape data of the object, and optical characteristics representing a condition of the surface which is an attribute of the object. Such calculation of an intensity of the surface of an object is achieved by first calculating an intensity by directly emitted light defined by light sources and thereafter calculating an intensity by mutual reflections between objects which is an indirect light.

FIG. 2 shows an intensity calculation by mutual reflection. In FIG. 2, a shape of an object is represented by a rectangle. The unit of the intensity calculation is called "a patch". It is assumed that a patch 22 is provided with an intensity by a direct light emitted from a light source 21. Also, an intensity by an indirect light is mutually given between the patch 22 and a patch 23. The intensity by the direct light is determined by the magnitude of the light source 21 and the distance between the light source 21 and the patch 22. For example, assuming that the magnitude of the light source 21 is represented by G, and the distance between the light source 21 and the patch 22 by $r_{21,22}$, when the magnitude of the light source is inversely proportional to the square of a distance, a direct light intensity is given by the following formula (3):

$$I_{direct}=G/(r_{21,22} \cdot r_{21,22}) \quad (3)$$

An intensity $I_{23,23}$ by the indirect light from the patch 23 to the patch 22 is determined by an intensity $I_{23}$ of the patch 23, a reflectance $\rho 23$ of the surface of the patch 23, an area A23, an angle $\phi$ formed by a line 26 and the normal of the patch 23, an angle $\psi$ formed by the line 26 and the normal of the patch 22, and a distance $r_{22,23}$, as given by the following formula (4):

$$I_{23,22}=I_{23} \cdot \rho_{23} \cdot A_{23} \cos\psi \cdot \cos\phi/(r_{22,23} \cdot r_{22,23}) \quad (4)$$

An intensity to the patch 22 is determined by the sum of an intensity by the direct light and an intensity by indirect light from all patches. Since the indirect light is generated by mutual reflections, an intensity calculation for the indirect light is performed by iterative calculations until a convergency is obtained.

As the result of the intensity calculations, it is assumed that a maximum intensity value is expressed by $I_{max}$, an intensity of a patch i by Ii, and a reflectance is assumed that a maximum intensity value is expressed by of the surface of the patch i by $\rho i$. If the value Y for the maximal intensity value is replaced by a value $Y_0$ which is the value Y for the standard white, a value $Y_{in}$ for a light incident to the patch i is given by the following formula (5):

$$Y_{in}=(Ii/I_{max}) \cdot Y_0 \quad (5)$$

A value Yi, which is a value Y for a light reflected by the patch i, is equal to the product of the value Y for the incident light and the reflectance $\rho i$ of the patch i, as shown by the following formula (6):

$$Y_i=\rho i \cdot Y_{in}$$

$$=\rho i \cdot (Ii/I_{max}) \cdot Y_0 \quad (6)$$

Next, reference is made to a color space mapping unit 4. In this embodiment, chromatic and achromatic color reference lights, the standard white and standard color patches are employed to calculate a mapping which represents a displacement amount of an arbitrary color in the color space. For the standard color patches, a plurality of color patches are employed which are uniformly distributed in the uniform color space. In this embodiment, a standard color patch having a lightness of 70 selected from these standard color patches, is given as an example. Image data generated when the standard white patch is irradiated with an achromatic color reference light Tn and a chromatic color reference light Tc is represented by the CIELAB uniform color space as $(L^*_{max}, 0, 0)$ and $(L^*_w, a^*_w, b^*_w)$ respectively. Also, image data generated when the standard color patch having a lightness of 70 is irradiated with an achromatic color reference light Tn and a chromatic color reference light Tc is represented by the chromaticity coordinates as $(L^*_n, a^*_n, b^*_n)$ and $(L^*_c, a^*_c, b^*_c)$ respectively. FIGS. 3A and 3B show the coordinates of the standard color patch in the color space irradiated with the achromatic and chromatic color reference lights. Also, FIG. 4 shows an example of measuring a lightness, a saturation and a hue when the standard color patch having a lightness of 70 is irradiated with the chromatic color reference light Tc.

In the color space mapping unit 4, a mapping $s(\theta)$ is defined such that $(L^*_{max}, 0, 0)$ $(L^*_w, a^*_w, b^*_w)$, $(L^*_n, a^*_n, b^*_n)$ and $(L^*_c, a^*_c, b^*_c)$ satisfy the formula (7). Assuming that $\theta$ is an angle extending over the both sides of a reference plane which links the chromaticity coordinates of the chromatic color light on the standard color patch irradiated with the chromatic color light and an achromatic color axis, as shown in FIG. 3B, the mapping $s(\theta)$ can be approximated, for example, as expressed by the following formula (8), due to a distortion of the color space caused by an irradiation with the chromatic color light. References $\theta_0$ and m designate values representing the color purity of the chromatic color light source Tc which are constants determined by experimental results.

$$L^*_c=(L^*_w/L^*_{max}) \cdot L^*_n$$

$$a^*_c=(L^*_w/L^*_{max}) \cdot a^*_n+s(\theta) \cdot (L^*_n/L^*_{max}) \cdot a^*_w$$

$$b^*_c=(L^*_w/L^*_{max}) \cdot b^*_n+s(\theta) \cdot (L^*_n/L^*_{max}) \cdot b^*_w \quad (7)$$

$$s(\theta) = \begin{cases} 1+m & (\theta \leq \theta_0) \\ 1 & (\theta > \theta_0) \end{cases}$$

Further, in the color space mapping unit 4, $(L^*_t, a^*_t, b^*_t)$ on the surface, which is irradiated with the chromatic color reference light Tc, is calculated by the following formula (9) based on $(L^*, a^*, b^*)$ converted by the color conversion unit 1:

$$L^*_t=(L^*_w/L^*_{max}) \cdot L^*$$

$$a^*_t=(L^*_w/L^*_{max}) \cdot a^*+s(\theta) \cdot (L^*/L^*_{max}) \cdot a^*_w$$

$$b^*_t=(L^*_w/L^*_{max}) \cdot b^*+s(\theta) \cdot (L^*/L^*_{max}) \cdot b^*_w \quad (9)$$

In a color compensation unit 5, $(L^*_t, a^*_t, b^*_t)$ calculated in the color space mapping unit 4 is compensated for the lightness by the use of a lightness compensation coefficient $\beta$ which is determined according to an intensity distribution of the surface of an object. Since the actual luminance of an image is varied depending upon image output characteristics of a display (7), the coefficient β is given by the following formula (10), with a coefficient representing a change in luminance being designated by α. As shown in the formula (10), the coefficient β is multiplied with $Y_0$.

$(L^*_{new}, a^*_{new}, b^*_{new})$ after the lightness compensation is calculated by the formulae (11), with the saturation being proportional to a lightness changing rate such that $(L^*_{new}, a^*_{new}, b^*_{new})$ will not exceed the lightness value $L^*_w$ of the standard white patch irradiated with the reference light:

$$Y_{new} = \alpha \cdot Y_i \qquad (10)$$
$$= \rho i \cdot (Ii/I_{max}) \cdot Y_0$$
$$= \beta \cdot Y_0$$

$$B = \alpha \cdot \rho i \cdot (Ii/I_{max})$$

$$L^*_{new} = \min(\beta^{1/3} \cdot (L^*_t + 16) - 16, L^*_w)$$

$$a^*_{new} = k \cdot a^*_t$$

$$b^*_{new} = k \cdot b^*_t \qquad (11)$$

The lightness compensation coefficient β in the formula (10) should have a value more than one for increasing the lightness and a value less than one for decreasing the lightness. Also, min ( ) is a function for returning the fewer one of two arguments, and the coefficient k in the formula (11) is defined by the following formula (12):

$$k = L^*_{new}/L^*_t \qquad (12)$$

Alternatively, the coefficient k may be defined by the formula (13). In either case of defining the coefficient k by the formula (12) or (13), it is possible to solely change the saturation and the lightness without changing the hue, wherein the saturation is changed in proportion to a lightness change. A saturation $S_{new}$ is calculated by a formula (14) according to a saturation compensation. FIG. 5 shows an example of a saturation handling which may be needed in consequence of a change in lightness.

$$k = L^*_{new}/L^*_t \quad (L^*_{new} \leq L^*_t)$$

$$(100 - L^*_{new})/(100 - L^*_t)(L^*_{new} \geq L^*_t) \qquad (13)$$

$$S_{new} = (a^*_{new}2 + b^*_{new}2)^{1/2} \qquad (14)$$

In FIG. 5, $(L^*_{new1}, a^*_{new1}, b^*_{new1})$ represents a compensation for increasing the lightness of the original $(L^*_t, a^*_t, b^*_t)$, and $(L^*_{new}, a^*_{new}, b^*_{new})$ a compensation for decreasing the lightness of the same.

A display luminance conversion unit 6 performs a color compensation in accordance with characteristics of a display 7. Such color compensation is achieved by the coefficient α employed in the formula (10). To determine α in the formula (10), display characteristics of the display 7 are used. The intensity of a patch is designated by Ii. Also, as the display characteristics, a maximum display luminance value of the display 7 is designated by $V_{disp, max}$, a minimum display luminance value of the same by $V_{disp, min}$, a maximum intensity of a display scene by $I_{scene, max}$, and a minimum intensity of the same by $I_{scene, min}$. Then, the maximum and minimum intensities of the display scene are determined, for example, by a formula (15), as a method of matching them with the maximum and minimum luminance of the display 7. Alternatively, there is also a method of determining the maximum and minimum intensities of the display scene so as to make a median value $I_{scene, mean}$ of the intensity of the display scene equal correspond to a median display luminance $V_{disp, mean}$ of the display 7. The latter method is determined as shown in the formula (16).

$$\alpha = \left[ \frac{V_{disp,max} - V_{disp,min}}{I_{scene,max} - I_{scene,min}} \cdot (I_i - I_{scene,min}) + V_{disp,min} \right], \qquad (15)$$

$$V_{disp,max}$$

$$\alpha = (I_i/I_{scene,mean}) \cdot (V_{disp,mean}/V_{disp,max}) \qquad (16)$$

As explained above, the present embodiment can produce effects as described below:

A lightness of texture data can be compensated for in accordance with the result of an intensity calculation with respect to the surface of an object, based on a ratio of an intensity to a maximum intensity, a reflectance of the object and the luminance of the standard white.

A lightness on a surface irradiated with a chromatic color reference light can be derived from a lightness on the surface irradiated with an achromatic color reference light by the use of a mapping representing a displacement amount of an arbitrary color in the color space which is calculated on the basis of the chromaticity coordinates of a standard color patch which is being irradiated with the chromatic and achromatic color reference lights.

Further, for changing a lightness of data representing a color image, an image processing method is provided which changes a saturation in proportion to a lightness changing rate, whereby a discrepancy in hue can be suppressed when a lightness of color image data inputted from an image inputting apparatus such as a color scanner is to be changed.

Furthermore, a natural image can be displayed on an image output unit by providing display characteristics of the image output unit.

The present invention is not limited to the above described embodiment, and a variety of modifications can be made based on the spirit of the present invention. Therefore, these modifications will not be excluded from the scope of the present invention.

We claim:

1. A color compensation method for a three-dimensional color image, said method comprising the steps of:

obtaining mapping data, in a uniform color space, representative of a transformation from chromaticity coordinate values of a standard white patch and a standard color patch irradiated with an achromatic reference light to respective chromaticity coordinate values of said standard white patch and said standard color patch irradiated with a chromatic color reference light;

irradiating an object surface with said achromatic reference light; and determining a chromaticity coordinate value of said object surface irradiated with said chromatic reference light based on (i) said mapping data and (ii) a coordinate value of said object surface irradiated with said achromatic reference light.

2. A color compensation device for three-dimensional color image generation, said device comprising a color space mapping unit, said color mapping unit comprising:

means for obtaining mapping data, in a uniform color space, representative of a transformation from chromaticity coordinate values of a standard white patch and a standard color patch irradiated with achromatic reference light to respective chromaticity coordinate values of said standard white patch and said standard color patch irradiated with a chromatic reference light, means for irradiating an object surface with said achromatic reference light; and means for determining a chromaticity coordinate value of said object surface irradiated with said chromatic reference light based on (i) said mapping data and (ii) a coordinate value of said object surface irradiated with said achromatic reference light.

3. A color compensation method for a three-dimensional image, said method comprising the steps of:

providing a standard white patch;

irradiating said standard white patch with a chromatic color reference light, determining the lightness level of said standard white patch, and setting said determined lightness level as a reference lightness level;

determining, when changing lightness of color image data, a changing ratio of saturation based on lightness of said color image data before and after changing said lightness of said color image data; and simultaneously changing (i) the lightness of said color image data in a uniform color space and (ii) a color saturation degree of the color image data in accordance with said changing ratio, such that a change of the lightness level of said color image data does not exceed said reference lightness level.

4. A color compensation device for three-dimensional color image generation, said device including a color compensation unit comprising:

means for irradiating a standard white patch with a chromatic color reference light, and determining the lightness level of said standard white patch, and setting said determined lightness level as a reference lightness level;

means for determining, when changing lightness of color image data, a changing ratio of saturation based on lightness of the color image data before and after changing said lightness of said color image data; and means for simultaneously changing (i) said lightness of said color image data in a uniform color space and (ii) a color saturation degree of said color image data in accordance with said changing ratio, such that a change of the lightness level of said color image data does not exceed said reference lightness level.

5. A color compensation method for a three-dimensional color image, said method comprising the steps of:

(a) providing a standard white patch;

(b) irradiating said standard white patch with an achromatic reference light;

(c) determining a first chromaticity coordinate value for said standard white patch indicative of a chromaticity of said standard white patch while being irradiated with said achromatic reference light;

(d) providing a standard color patch;

(e) irradiating said standard color patch with said achromatic reference light;

(f) determining a first chromaticity coordinate value for said standard color patch indicative of a chromaticity of said standard color patch while being irradiated with said achromatic reference light;

(g) irradiating said standard white patch with a chromatic reference light;

(h) determining a second chromaticity coordinate value for said standard white path indicative of a chromaticity of said standard white patch while being irradiated with said chromatic reference light;

(i) irradiating said standard color patch with said chromatic reference light;

(j) determining a second chromaticity coordinate value for said standard color patch indicative of a chromaticity of said standard color patch while being irradiated with said chromatic reference light;

(k) obtaining mapping data, in a uniform color space, representative of a transformation from (1) said first chromaticity coordinate values of said standard white patch and said standard color patch to (2) said second chromaticity coordinate values of said standard white patch and said standard color patch;

(l) providing an object surface;

(m) irradiating said object surface with said achromatic reference light;

(n) determining a first chromaticity coordinate value for said object surface indicative of a chromaticity of said object surface while being irradiated with said achromatic reference light; and (o) determining a second chromaticity coordinate value for said object surface indicative of a chromaticity of said object surface which would result when said object surface is irradiated with said chromatic reference light in accordance with (1) said mapping data and (2) said first chromaticity coordinate value for said object surface.

6. A color compensation device for three-dimensional color image generation, said device comprising a color space mapping unit, said color space mapping unit comprising:

(a) means for irradiating a standard white patch with an achromatic reference light;

(b) means for determining a first chromaticity coordinate value for said standard white patch indicative of a chromaticity of said standard white patch while being irradiated with said achromatic reference light;

(c) means for irradiating a standard color patch with said achromatic reference light;

(d) means for determining a first chromaticity coordinate value for said standard color patch indicative of a chromaticity of said standard color patch while being irradiated with said achromatic reference light;

(e) means for irradiating said standard white patch with a chromatic reference light;

(f) means for determining a second chromaticity coordinate value for said standard white patch indicative of a chromaticity of said standard white patch while being irradiated with said chromatic reference light;

(g) means for irradiating said standard color patch with said chromatic reference light;

(h) means for determining a second chromaticity coordinate value for said standard color patch indicative of a chromaticity of said standard color patch while being irradiated with said chromatic reference light;

(i) means for obtaining mapping data, in a uniform color space, representative of a transformation from (1) said first chromaticity coordinate values of said standard white patch and said standard color patch to (2) said second chromaticity coordinate values of said standard white patch and said standard color patch;

(j) means for irradiating said object surface with said achromatic reference light;

(k) means for determining a first chromaticity coordinate value for said object surface indicative of a chromaticity of said object surface while being irradiated with said achromatic reference light; and (l) means for determining a second chromaticity coordinate value for said object surface indicative of a chromaticity of said object surface which would result when said object surface is irradiated with said chromatic reference light in accordance with (1) said mapping data and (2) said first chromaticity coordinate value for said object surface.

* * * * *